United States Patent [19]

Woelfel et al.

[11] Patent Number: 5,022,712

[45] Date of Patent: Jun. 11, 1991

[54] FIBER-REINFORCED RESIN VEHICLE WHEEL MOUNTING

[75] Inventors: James A. Woelfel, Lansing; Thomas A. Hineline, Dewitt, both of Mich.

[73] Assignee: Motor Wheel Corporation, Lansing, Mich.

[21] Appl. No.: 405,753

[22] Filed: Sep. 11, 1989

Related U.S. Application Data

[63] Continuation-in-part of Ser. No. 292,372, Dec. 30, 1988, abandoned.

[51] Int. Cl.$^5$ .............................................. B60B 5/02
[52] U.S. Cl. ........................... 301/63 PW; 301/9 DN; 430/30; 430/332
[58] Field of Search ..................... 301/63 PW, 9 DN; 430/332, 30; 252/42.7, 49.7

[56] References Cited

U.S. PATENT DOCUMENTS

| | | | |
|---|---|---|---|
| 3,395,018 | 7/1968 | Read | 430/332 |
| 4,294,490 | 10/1981 | Woelfel | 301/63 PW |
| 4,413,860 | 11/1983 | Prescott | 301/63 PW |
| 4,514,013 | 4/1985 | Woelfel | 301/63 PW |
| 4,867,892 | 9/1989 | Habeeb et al. | 252/42.7 |

FOREIGN PATENT DOCUMENTS

| | | | |
|---|---|---|---|
| 0282008 | 9/1988 | European Pat. Off. | 301/63 PW |
| 1939910 | 2/1971 | Fed. Rep. of Germany | 301/63 PW |

*Primary Examiner*—Russell D. Stormer
*Attorney, Agent, or Firm*—Barnes, Kisselle, Raisch, Choate, Whittemore & Hulbert

[57] ABSTRACT

A fiber-reinforced composite vehicle wheel that comprises an annular rim for receiving a vehicle tire and a central disc internally spanning the rim for mounting the rim and tire on a vehicle. Mounting openings are formed in the wheel disc in an array that surrounds the wheel axis of rotation, and are received in assembly with a vehicle over mounting studs that project from a mounting plate. Mounting nuts are threaded onto the studs and seated against opposing axially-oriented conical surfaces of the wheel disc surrounding each mounting opening for clamping the wheel firmly against the mounting plate. A layer of antiseize lubricant is located on the disc seating surfaces surrounding the mounting openings prior to assembly of the fastener nuts.

27 Claims, 1 Drawing Sheet

FIBER-REINFORCED RESIN VEHICLE WHEEL MOUNTING

This application is a continuation-in-part of application Ser. No. 07/292,372 filed Dec. 30, 1988 now abandoned.

The present invention is directed to fiber-reinforced composite (resin) vehicle wheels, and more particularly to mounting of fiber-reinforced composite wheels on a vehicle.

BACKGROUND AND OBJECTS OF THE INVENTION

The art of fiber-reinforced composite (resin) vehicle wheel manufacture, as taught for example by U.S. Pat. Nos. 4,294,490 and 4,294,639, is now sufficiently advanced that such wheels are superior in many respects—e.g., corrosionresistance, fuel economy and durability—to conventional steel and aluminum-alloy wheels. However, a problem that has continued to plague the art lies in securely mounting such wheels to a vehicle, specifically in maintaining desired fastener torque clamping tension in the wheel-mounting studs. The resin in the composite wheel structure has exhibited a tendency to creep under high clamping stress, particularly when subjected to high temperatures during severe brake-cycle vehicle tests.

One early approach to the fastener torque-retention problem, exemplified in U.S. Pat. Nos. 3,309,843, 3,811,737 and 3,870,372, contemplates provision of metallic inserts in the wheel-mounting openings for absorbing fastener compressive stresses. However, this technique involves placement and control of insert location during the molding operation, or additional post-molding operations to add the inserts, both with consequent additional costs. Moreover, control of fiber orientation during the molding operation presents a problem where the inserts are moled in place. Whether the inserts are placed in the wheel during the molding operation or in a subsequent machining and fastening operation, there is the possibility of separation of the insert from the surrounding fiber-reinforced composite wheel body. Moreover, as will be noted in connection with experimental test results in the following description, such inserts do not overcome the torque-retention problem.

U.S. Pat. Nos. 4,489,184 and 4,569,957 discloses a resin composition that exhibits enhanced temperature/stress stability, and is suitable for use in fiber-reinforced resin vehicle wheel manufacture to overcome the problem of resin creep around the wheel mounting studs. However, it has been found that the reinforcing fibers themselves present a problem that must be addressed. Specifically, where it has been attempted to form the mounting openings during the molding operation, it has been found that the mold plugs cause uneven distribution and orientation of reinforcing fibers around the mounting openings, sometimes resulting in crack formation in underreinforced portions of the wheel disc. Thus, as disclosed in U.S. Pat. Nos. 4,294,490 and 4,294,639, it is preferable to form the wheel-mounting disc as an imperforate structure during the molding operation in which distribution and orientation of reinforcing fibers can be closely controlled, and to thereafter form the mounting openings in a machining (drilling) operation.

However, such machining of the disc body necessarily severs reinforcing fibers at the surface of the opening, so that fiber ends are exposed at the surface around each mounting opening against which the fastener nut must seat. It has been found that such fiber ends frictionally resist sliding of the opposing nut surface as the nut is tightened. As is well known in the fastener art, torque applied to the mounting nut during tightening is a function both of tension applied to the stud and of sliding friction between the nut and the underlying surface. Where the sliding surfaces exhibit a high coefficient of friction, as in the case where the fastener nut must be tightened against a wheel surface at which reinforcing fiber ends are exposed, tightening the mounting nut to a specified torque as is conventional in the art does not place sufficient tension on the mounting stud to retain clamping pressure and mounting torque during vehicle operation. That is, in mounting wheels of the subject character, the coefficient of friction between the nuts and wheel seating surfaces is excessive, which reduces the tension applied to the mounting studs during the initial tightening operation. For this reason, the wheel mounting nuts typically retain substantially less than 50% of the initial fastening torque after high temperature torque-retention tests.

It is therefore a general object of the present invention to provide a wheel mounting arrangement and method that overcome the aforementioned deficiencies in the art, that are economical to implement in mass production of vehicle wheels and mounting thereof on vehicles, that can be readily implemented in the field during replacement of vehicle wheels, that employ conical nuts of the configuration that is accepted as industry standard for mounting aluminum alloy wheels, and that retains initial fastening torque at a level comparable to that exhibited by conventional steel and aluminum alloy wheels.

Another and related object of the invention is to provide a fiber-reinforced resin vehicle wheel and method of manufacture that are specifically adapted to overcome the aforementioned problems in the art during mounting and use thereof on a vehicle without requiring any intervention or steps by the person mounting the wheel on the vehicle other than those otherwise conventionally employed.

SUMMARY OF THE INVENTION

A fiber-reinforced resin vehicle wheel in accordance with a presently preferred embodiment of the invention comprises an annular rim for receiving a vehicle tire and a central disc internally spanning the rim for mounting the rim and tire on a vehicle. At least the wheel disc, and preferably the entire wheel, is of integral fiber-reinforced composite (resin) construction. Mounting openings are formed in the wheel disc in an array that surrounds the wheel axis of rotation, and are received in assembly with a vehicle over mounting studs that project from a vehicle mounting back or plate. Mounting nuts are threaded onto the studs and seated against opposing axially-oriented surfaces of the wheel disc surrounding each mounting opening for clamping the wheel firmly against the mounting plate. Preferably, the fastener seating surface around each mounting opening, and the opposing surface of the mounting nuts, are of complementary conical construction.

In accordance with the present invention, a layer of lubricant is located on the disc seating surfaces surrounding the mounting openings prior to tightening of the mounting nuts. Such lubricant functions to reduce sliding friction between the opposing seating surfaces of the nuts and disc during the tightening operation, so that a greater portion of the initial tightening torque is related to the tension applied to the studs. Preferably, the lubricant is applied to the seating surfaces of the wheel disc at the time of wheel manufacture following machining of the mounting openings and seating surfaces. The lubricant preferably takes the form of an antiseize lubricant paste composition that includes mineral oil and metallic particles of copper, aluminum or lead. The paste is initially applied over the conical seating surfaces at a thickness in the range of about 0.07 to 0.80 mm, preferably about 0.14 to 0.40 mm, and most preferably about 0.27 mm. The paste thus remains part of the wheel assembly during storage and shipment, and the lubricant is automatically positioned in the desired amount and location beneath the mounting nuts without intervention or further action by the wheel-mounting operator.

It will be recognized that use of a lubricant between the mounting nut and the underlying disc seating surface is contrary to conventional wisdom and practice in the art. Specifically, it is conventionally considered to be highly undesirable to lubricate and thereby reduce sliding friction between the nut and disc surfaces in mounting of steel, aluminum, magnesium and other metallic wheels. Use of a lubricant in the environment of a metal wheel so reduces the relationship of sliding friction to stud tension that tightening of the nut to the pre-specified torque results in over-tensioning of the stud, and may either fracture the studs or collapse the mounting-opening bosses in the case of stamped steel wheels. However, it was discovered as a result of a fortuitous occurrence, in which antiseize lubricant was accidentally spilled on the seating surfaces of a fiber-reinforced composite vehicle wheel at the test facilities of applicants' assignee, that such lubricant advantageously reduces sliding friction in this particular application only to a level at which torque to be applied to the composite wheel mounting nuts is analogous to that conventionally applied to metal wheel mounting nuts, and the relationship of frictional torque to stud tension is so altered that the mounting nuts retain at least 50%, and typically 80%–90%, of the initial tightening torque after high-temperature torque retention tests.

BRIEF DESCRIPTION OF THE DRAWING

The invention, together with additional objects, features and advantages thereof, will be best understood from the following description, the appended claims and the accompanying drawing in which:

DETAILED DESCRIPTION OF PREFERRED EMBODIMENT

Figure 1:
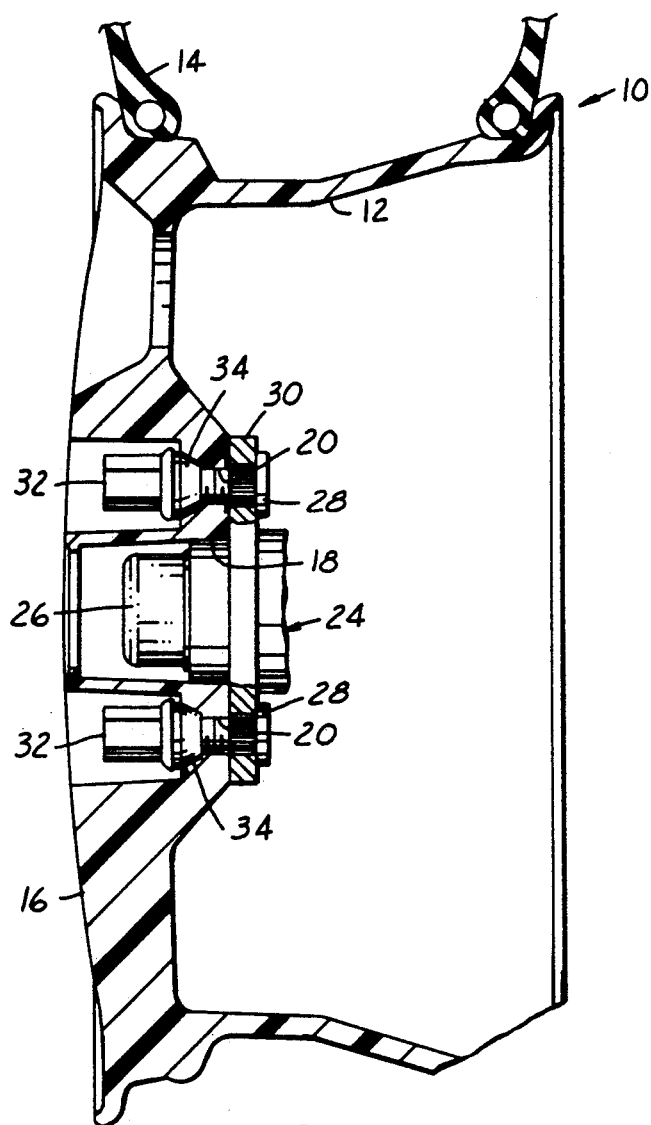
FIG. 1 is a sectional view in side elevation of a vehicle wheel mounting arrangement in accordance with a presently preferred embodiment of the invention.
Figure 3A:
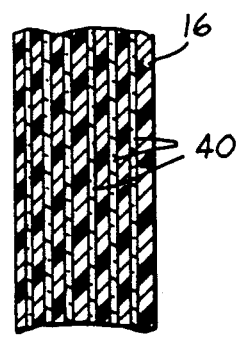
FIGS. 3A–3D are schematic diagrams that illustrate manufacture and mounting of the wheel in FIG. 1.
Figure 3B:
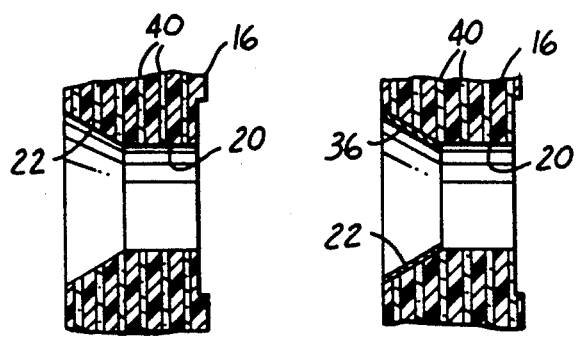

FIG. 1 illustrates a wheel 10 in accordance with a presently preferred embodiment of the invention as comprising an annular rim 12 that includes axially spaced bead seats on which a tire 14 is removably mounted. A wheel-mounting disc 16 internally spans rim 12. Disc 16 includes a central mounting opening 18 and a plurality of bolt openings 20 in a circumferential array that surrounds center opening 18. The outboard end (i.e., the end away from the vehicle) of each mounting opening 20 is outwardly flared to form a conical seating surface 22 (FIG. 3B). In assembly to a vehicle, wheel disc 16 is placed over a spindle or axle 24 such that the hub 26 is received within disc center opening 18, and disc mounting openings 20 are received over respective threaded studs 28 that project axially outwardly from the mounting back or plate 30. Mounting nuts 32 are threadably received on each stud 28. Each nut 32 has a conical base 34 for facing abutment with a corresponding seating surface 22 on disc 16.

Figure 2:
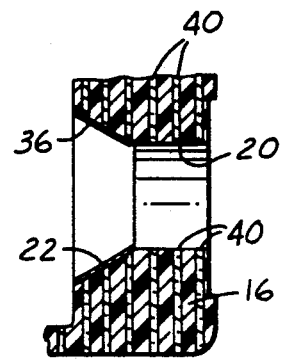
FIG. 2 is a fragmentary sectional view on an enlarged scale of a disc mounting opening in the wheel of FIG. 1.
Figure 3C:
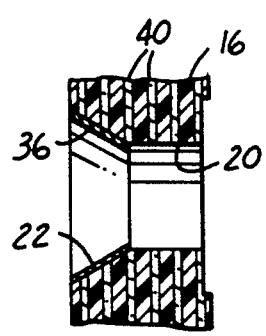
Figure 3D:
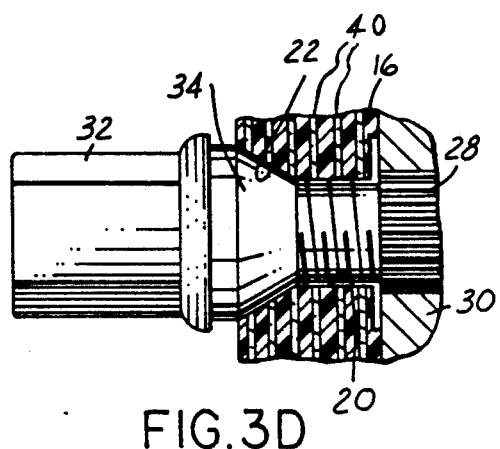

In accordance with the present invention, a layer 36 (FIGS. 2 and 3C) of lubricant is placed on each seating surface 22 of disc 16 prior to tightening of nut 32 there against. Lubricant layer 36 preferably is so-called antiseize lubricant of composition that includes mineral oil and metallic particles, such as copper, aluminum or lead. One antiseize lubricant that is presently preferred in practice of the invention is marketed by Loctite Corporation, Antiseize Thread Compound 767, and is stated by the manufacturer to be a composition that consists essentially of mineral oil in the amount of about 55–60 weight percent (w/%), metallic copper particles in the amount of about 15–20 w/%, powdered graphite in the amount of about 15–20 w/%, metallic aluminum particles in the amount of about 5–10 w/%, and silicon dioxide powder in the amount of about 3 w/%. Such lubricant is preferably applied as a paste at the time of wheel manufacture in a layer over the substantially entire surface 22 around each opening 20. The thickness is preferably in the range of about 0.07 to 0.80 mm, more preferably about 0.14 to 0.40 mm, and most preferably about 0.27 mm. Other antiseize lubricants may be employed, such as a lubricant marketed by Balcamp Corporation that employs metallic lead particles rather than metallic copper particles.

FIGS. 3A–3D illustrate manufacture and mounting of wheel 10 in accordance with the presently preferred embodiment of the invention. Wheel 10 is initially molded as an integral rim and disc wheel structure in accordance with the teachings of U.S. Pat. Nos. 4,294,490 and 4,294,639 so that the reinforcing fibers in both the rim and disc portions of the wheel structure are in predetermined concentrations and orientations with respect to the wheel axis. Specifically, as disclosed in the noted patents, it is preferred that the disc be molded as an imperforate structure having discontinuous reinforcing fibers 40 (FIGS. 2–3D) disposed predominantly in planes orthogonal to the wheel axis and oriented substantially randomly within each of the planes. Other fiber orientations in the wheel disc as molded, although not presently preferred, include axial fiber orientations as disclosed in U.S. Pat. No. 4,072,358 and/or crossed fiber orientation as disclosed in U.S. Pat. No. 3,369,843.

In a next stage of wheel manufacture illustrated in FIG. 3B, each mounting opening 20 and seating surface 22 is formed, preferably in a single machining operation. As a result of this operation, fibers 40 are cut by the forming tool so that fiber ends terminate and are exposed at the several seating surfaces 22. Layers 36 (FIG. 3C) of antiseize lubricant are then applied over seating surfaces 22 as a paste as previously described. In this way, lubricant layers 36 remain with the wheel during storage and transport. Thereafter, when the wheel is mounted on a vehicle and nuts 32 are tightened over studs 28 (FIGS. 1 and 3D), the antiseize lubricant layer lubricates sliding motion between nut seat 34 and seating surface 22.

During high-temperature torque retention tests involving a number of severe braking cycles specifically designed for testing torque retention of composite (resin) wheel mounting nuts, it was found that wheel mounting arrangements in accordance with the present invention exhibited torque retention in the range of 80–90% of initial tightening torque, as compared with a range of 40–60% for identical wheels without antiseize lubricant, and a range of 30–35% typical for wheels of similar construction employing steel inserts in the mounting openings.

A method of application to assure that each of the machined conical nut seats has been covered with the antiseize lubricant has been found with an ultraviolet light (black light) sensitive dye mixed into the antiseize compound. A small quantity of a dye manufactured by Keystone Aniline Corporation was found to be an excellent material which, when mixed with the antiseize, appears as a yellow (mustard color) under black light. This assures that antiseize has been applied and can be visually inspected by operator or by automated methods. A ratio that has been worked out is (weight/weight) antiseize to dye. The dye is called Keytech Tracer Yellow R. It is the only one tried to date.

The invention claimed is:

1. A fiber-reinforced composite vehicle wheel that comprises an annular rim for mounting of a vehicle tire and a wheel-mounting disc internally spanning said rim, said disc having a plurality of mounting openings disposed in a circular array around a wheel-mounting axis and being constructed to be received over threaded studs on wheel-mounting structure, means forming an axially oriented, surface surrounding each said opening on one face of said disc for seating engagement with threaded fasteners received on the studs, reinforcing fibers being oriented in said disc such that fiber ends terminate at said seating surfaces, and lubricant on each said seating surface to reduce frictional engagement between the fastener and said fiber ends at said surfaces.

2. The wheel set forth in claim 1 wherein each said opening comprises a substantially cylindrical opening terminating at said one face in a conical seating surface coaxial with said opening.

3. The wheel set forth in claim 2 wherein said lubricant comprises an antiseize lubricant disposed in a layer substantially covering each said conical seating surface.

4. The wheel set forth in claim 3 wherein said lubricant comprises a paste of a thickness in the range of about 0.07 to 0.80 mm.

5. The wheel set forth in claim 3 wherein said lubricant comprises a mixture of mineral oil and metallic particles.

6. The wheel set forth in claim 5 wherein said mixture comprises mineral oil in the amount of about 55–60 w/% and metallic particles in the amount of about 20–30 w/%.

7. The wheel set forth in claim 6 wherein said metallic particles are of composition selected from the group consisting of copper, aluminum and lead.

8. The wheel set forth in claim 7 wherein said antiseize lubricant mixture further includes graphite in the amount of about 15–20 w/% and powdered silicon dioxide in the amount of 3 w/%.

9. The wheel set forth in claim 5 wherein said reinforcing fibers in said disc comprise discontinuous fibers disposed essentially in planes perpendicular to said axis.

10. The wheel set forth in claim 4 wherein said thickness is in the range of about 0.14 to 0.40 mm.

11. The wheel set forth in claim 10 wherein said thickness is about 0.27 mm.

12. The wheel set forth in claim 1 further comprising means mixed with said lubricant for indicating application of said lubricant to said seating surface.

13. The wheel set forth in claim 12 wherein said application-indicating means comprises a light-sensitive dye.

14. The wheel set forth in claim 12 wherein said dye is sensitive to ultraviolet light.

15. A fiber-reinforced composite wheel that comprises an annular rim portion and a central disc portion internally spanning said rim portion, said disc portion including at least one opening for mounting the wheel to wheel-support structure, said opening being surrounded by an axially oriented surface for seating engagement by a fastener, reinforcing fibers in said disc portion being oriented to terminate at said seating surface, and a lubricant on said seating surface to reduce frictional engagement between the fastener and fiber ends at said surface.

16. The wheel set forth in claim 15 wherein said lubricant comprises a mixture of mineral oil and metallic particles.

17. The wheel set forth in claim 16 wherein said mixture comprises mineral oil in the amount of about 55–60 w/% and metallic particles in the amount of about 20–30 w/%.

18. The wheel set forth in claim 17 wherein said metallic particles are of composition selected from the group consisting of copper, aluminum and lead.

19. The wheel set forth in claim 17 wherein said lubricant mixture further includes graphite in the amount of about 15–20 w/% and powdered silicon dioxide in the amount of about 3 w/%.

20. The wheel set forth in claim 16 wherein said lubricant comprises a layer of said lubricant substantially covering each said conical seating surface.

21. The wheel set forth in claim 20 wherein said lubricant comprises a paste of a thickness in the range of 0.07 to 0.80 mm.

22. The wheel set forth in claim 21 wherein said thickness is in the range of about 0.14 to 0.40 mm.

23. The wheel set forth in claim 22 wherein said thickness is about 0.27 mm.

24. The wheel set forth in claim 15 further comprising means mixed with said lubricant for indicating application of said lubricant to said seating surface.

25. The wheel set forth in claim 24 wherein said application-indicating means comprises a light-sensitive dye.

26. A fiber-reinforced composite vehicle wheel that comprises an annular rim for mounting of a vehicle tire and a wheel-mounting disc internally spanning said rim, said disc having a plurality of mounting openings disposed in a circular array around a wheel-mounting axis and being constructed to receive threaded fasteners for operable connection to wheelmounting structure, means forming a fastener-engagement seating surface surrounding each said opening on one face of said disc for individual seating engagement with the threaded fasteners, reinforcing fibers being oriented in said disc such that fiber ends terminate at said seating surfaces, and lubricant on each said seating surface to reduce frictional engagement between the associated one of said fasteners and said fiber ends at said surfaces.

27. The wheel set forth in claim 26 wherein each said opening comprises a substantially cylindrical opening terminating at said one face in a conical seating surface coaxial with said opening and defining said fastener engagement seating surface.

* * * * *